Patented Mar. 3, 1953

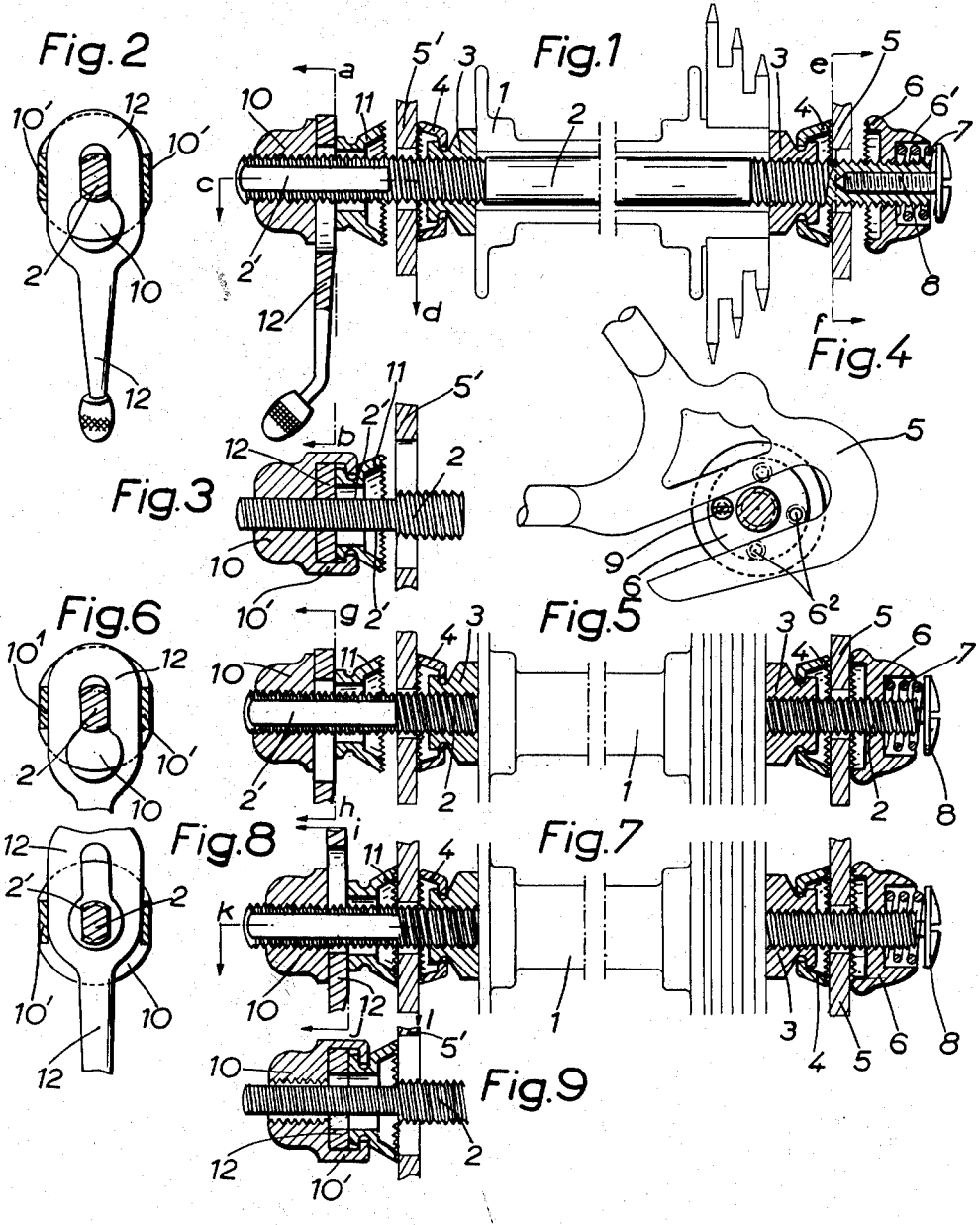

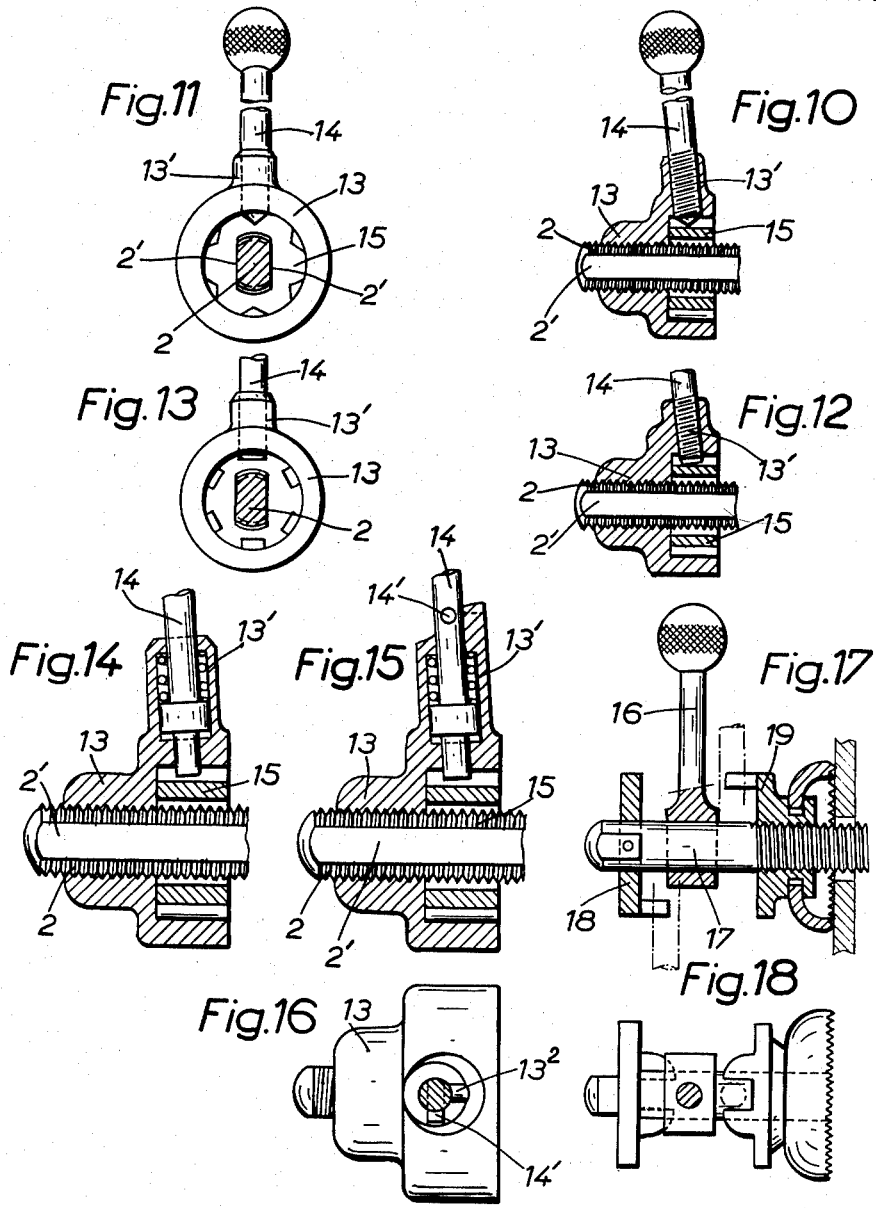

2,630,020

UNITED STATES PATENT OFFICE 2,630,020

DISMOUNTABLE BICYCLE AND THE LIKE HUB

Lucien Juy, Dijon, Côte-d'Or, France

Application July 21, 1949, Serial No. 106,054
In France October 8, 1948

11 Claims. (Cl. 74—242.14)

My invention has for its object improvements to my copending application Serial No. 106,053, filed this day, now Patent No. 2,511,985, of June 20, 1950, entitled assembling and dismantling of bicycle hubs; said improvements relate primarily to a brake provided against unscrewing of the collar screwed on the hub spindle that is not associated with the control lever and also to means for angularly securing said collar when it has entered the desired position with reference to the spindle. Furthermore, the present invention covers modifications in the connection between the control lever and the parts operated thereby that form interesting substitutes for the arrangement disclosed in copending specification.

For properly defining said improvements without, however, restricting its scope in any way, in the accompanying drawings:

Fig. 1 shows, in a sectional assembly view, the mounting of a rear hub in the slots of the frame brackets, after loosening of the end collars to ease the engagement in these slots. The collar that is not coupled with the control lever is furnished with a brake working through friction of a coil spring.

Fig. 2 shows in a sectional contour view through $a$—$b$ (Fig. 1) the position of the control lever corresponding to the possibility of driving the spindle of the hub by flat portions of this spindle.

Fig. 3 shows, in a sectional plan view through $c$—$d$ (Fig. 1) the arrangement of the control lever with reference to the collar in which it is held sideways by two flanges rigid with the said collar, these flanges being bent over so as to engage the circular groove of the bearing ring.

Fig. 4 shows, in a side view, through $e$—$f$ (Fig. 1), the device according to the invention, for the angular fastening in relation to the hub spindle of the end collar, by a lug engaged in the slot of the frame bracket and blocked in the said slot.

Fig. 5 shows, in a sectional view of the assembly, the first stage of clamping of the hub through the rotation of the hub spindle that urges the end collar against the bracket in the slot of which is blocked the lug that fastens angularly the said collar.

Fig. 6 shows, in a side sectional view through $g$—$h$ (Fig. 5) the position of the control lever corresponding to the driving of the spindle of the hub for the first clamping operation.

Fig. 7 shows, in a sectional assembly view, the second clamping stage of the hub, that consists in transmitting, through the control lever when disengaged from the flat parts of the hub spindle, a rotary motion to the collar for clamping its ring against the frame bracket.

Fig. 8 shows, in a side sectional view through $i$—$j$ (Fig. 7), the position of the control lever that is loose in relation to the spindle of the hub while corresponding to the rotation and drive of the collar.

Fig. 9 shows, in a plan view and section through $k$—$l$ (Fig. 7), the position of the control lever and of its collar at the time of the second clamping operation of the hub.

Fig. 10 shows, in a partly sectionalized view, a modification of the double-acting control.

Fig. 11 shows an outer side view corresponding to Fig. 10.

Fig. 12 shows, in a partly sectionalized view, a second modification of the double-acting control.

Fig. 13 shows an outer side view corresponding to Fig. 12.

Fig. 14 illustrates, on a larger scale, a method of execution of the lever for double-acting control according to Figs. 10 and 12.

Fig. 15 shows, on a larger scale, in a partly sectionalized view, another form of execution of the lever acting on a sloping surface for the double-acting control according to Figs. 10 and 12.

Fig. 16 is a plan view corresponding to Fig. 15.

Fig. 17 shows a method of execution of the control lever that may slide on a smooth end of the spindle of the hub so as to be brought into engagement, through its end, with the forks formed by each of the two lugs, one of the latter being fixed rigidly with the spindle and the other being screwed on the said spindle. The outline in broken lines shows the engaging positions of the lever.

Fig. 18 is a plan view corresponding to Fig. 17.

The hub illustrated in the various figures and its system of rapid assembly and dismantling being that disclosed in the copending application, it would seem advisable, in order to bring out clearly the improvements that form the object of the present invention, to disclose again fully the characteristic features and the working principle of the system of quick assembly and dismantling.

On the spindle 2 of a hub 1 of standard pattern, that may be either a rear or front hub, are screwed on each side of the actual hub the clamping locknuts 3 provided with a shoulder showing a circular groove in which is set a supporting ring 4 bearing against the brackets 5 and 5' of the frame, and of which the base portion may be fluted or grooved so as to avoid any slipping out at the time of clamping, these rings being capable of rotating independently of the locknuts.

At one end of the spindle 2, opposite the brackets, is screwed the collar 6 provided with a fluted or striated bearing surface, and a circular recess 6' in which is housed, round the spindle 2, a frictional coil spring 7 bearing, on one hand against the bottom of the recess 6' and, on the other hand, against the head of the screw 8 adapted to adjust the friction by screwing or unscrewing into the end of the spindle 2.

In front of the bracket 5, as shown in Fig. 4, the collar 6 is drilled with threaded holes 6² of which one takes, after a final adjustment of the angular position of the control lever, a checking lug 9 adapted to abut against the side of the usual slot in the bracket 5, in order to prevent any rotation of the collar 6 and to enable it to have only a translational movement on the spindle 2.

On the opposite end of the spindle 2, facing the bracket 5' is screwed the collar 10 of which the flange extends under the form of two diametrically opposed lugs 10' that are bent over at their ends to engage in an annular groove of the supporting ring 11 having also a fluted or striated contact surface. The ring 11 may thus have an independent rotary movement and moves translationally in unison with the collar 10. Between the collar 10 and the ring 11 is housed the control lever 12 that is likewise held laterally by the lugs 10' and that inside the mortising or housing constituted by the assembly described, may be shifted transversally, assuming two positions in respect to the spindle 2 that goes through it, and to the flat portions 2' appearing at this end of the spindle.

*First position of the lever 12.*—(Figs. 2 and 6). The flat parts 2' of the spindle 2 are engaged in the narrow end of the slot in the control lever 12.

*Second position.*—(Fig. 8). The spindle 2 is introduced freely, with a certain amount of play, in the circular release end of the slot in the control lever 12.

With the system of quick assembly and dismantling thus disclosed, in order to engage the hub between the brackets 5 and 5' of the frame, the proper procedure is first of all to unscrew by several turns the collars 6 and 10, in order to obtain, between these collars and the corresponding bearing rings 4, enough space so as to be able to position easily the hub between the frame brackets. For the purpose of avoiding an easily overdue slackening of the collar 6, and even the escape of the latter off the thread of the spindle 2, there have been provided the screw 8 and the frictional coil spring 7 that then place a check on the amount of slackening.

With the hub placed in its normal position in the notches of the brackets, its clamping between the brackets is carried out by the single operation of the control lever 12, in two stages as stated.

*First stage.*—(Figs. 5 and 6). The control lever 12 and the collar 10 are made rigid with the spindle 2 by engaging the narrow end of the slot of the lever on the flat parts 2' of the spindle. The rotary movement of the control lever in the direction of screwing up involves the rotation of the spindle 2 at the end of which spindle is carried out the translational movement of the collar 6 that is held angularly by the lug 9, and that results in its being clamped strongly against the bracket 5.

*Second stage.*—(Figs. 7, 8, 9). The control lever 12 and the collar 10 are given a rotary motion independent of the spindle 2, that is located, after sliding of the lever, in the circular release portion of the slot in the said lever. The rotation of the control lever that turns still in the direction of screwing up, imparts a rotary motion to the collar 10 alone that is screwed on the spindle until clamped with the bracket 5' through contact of its bearing ring 11 therewith.

As a modification, the collar 10 may be replaced by a collar 13 according to Figs. 10, 11, 12, 13, 14, 15, 16, this collar then forming a boss 13' for taking the end of the control lever 14; said end may be engaged or disengaged at will through screwing or unscrewing from one of the notches or recesses that line the periphery of the ring 15; these notches may be triangular in shape for instance (Fig. 11) or rectangular (Fig. 13) or shaped otherwise. The ring 15 is housed in the collar 13 and may turn freely in the latter; the spindle 2 also passes through the ring 15 and the ring is fitted over said spindle through its central opening corresponding in shape with the flat parts 2' of the spindle. According to this arrangement, if the end of the control lever 14 is not engaged in one of the notches of the ring 15, the screwing and forward movement of the collar 13 may be controlled by the lever; but when the end of the control lever 14 lies in one of the notches of the ring 15, the rotation of both the ring 15 and the spindle 2 may be controlled and consequently the screwing up of the opposite end collar 6. This engagement or disengagement of the end of the rod of the control lever 14 may be carried out through screwing or unscrewing of the lever end in the boss 13' (Figs. 10 and 13), or merely by a translational movement of the lever (Fig. 14) against a spring or through rotation of the lever (Fig. 15) of which a finger 14' moves on a sloping surface formed by the outer end of the boss 13', said finger being held in a notch 13² (Fig. 16) corresponding to an extreme position of the lever longitudinally of the boss. Figs. 17 and 18 show a control lever 16 of which the inner end corresponding with the smooth part of the spindle 17 carrying the hub may move axially of the spindle so that the control lever may be brought to engage the gap between the arms of either fork constituted respectively by the lugs 18 and 19, the lug 18 being rigid with the spindle 17 and the lug 19 being screwed on the said spindle to form the equivalent of the collar 10. This arrangement enables a double clamping to be performed as in the previous cases.

As is obvious and as apparent from the preceding disclosure, my invention is not restricted in any way to that application, any more than to those embodiments of its various parts that have been more specially mentioned; it takes in on the other hand all modifications falling within the scope of accompanying claims.

What I claim is:

1. A hub arrangement chiefly for association with bicycle frames comprising two lugs rigid with the frame, a spindle revolubly carried by said lugs, a hub fitted over said spindle between the two lugs, a nut-shaped member screwed over each end of the spindle and frictionally engaging the cooperating frame lug through its inner end, a shiftable lever engaging positively and permanently one nut-shaped member and adapted to engage also positively the spindle for a predetermined position of said lever and to release same for another position thereof, a brake member associated with the outer end of the spindle on the side furthest from the lever in direction of the axis of the spindle and a coil spring fitted between the brake member and the nut-shaped member on the corresponding end of the spindle for urging the latter member into engagement with the cooperating frame lug.

2. A hub arrangement chiefly for association with bicycle frames comprising two lugs rigid with the frame, a spindle revolubly carried by said lugs and provided with a longitudinal tapped blind bore at one end, a hub fitted over said spindle between the two lugs, a nut-shaped member screwed over each end of the spindle and including means frictionally engaging the cooperating frame lug through its inner end, a shiftable lever engaging positively and permanently the nut-shaped member corresponding to the untapped end of the spindle and adapted to engage also positively the spindle for a predetermined position of said lever and to release same for another position thereof, a screw with a large head engaging the tapped bore in the spindle and a coil spring held under compression between the head of said screw and the corresponding nut-shaped member.

3. A hub arrangement chiefly for association with bicycle frames comprising two lugs rigid with the frame provided with transversal slots, a spindle threaded at each end and revolubly carried by the lug slots, a hub fitted over said spindle and held between the two lugs, a first nut-shaped member screwed over one end of the spindle and incorporating means adapted to frictionally engage the cooperating frame lug and provided with a plurality of tappings facing said lug, a projecting stud adapted to be threadedly and selectively engaged in one of said tappings for engaging the slot in the corresponding lug, a second nut-shaped member screwed over the other end of the spindle, a shiftable lever engaging positively and permanently said second nut-shaped member and adapted to engage also positively the spindle for a predetermined position of said lever and to release same for another position thereof and adjustable means associated with said first nut-shaped member for normally preventing its rotation around its corresponding spindle end.

4. A hub arrangement chiefly for association with bicycle frames comprising two lugs rigid with the frame, a spindle revolubly carried by said lugs, a hub fitted over said spindle between the two lugs, a nut-shaped member screwed over each end of the spindle and frictionally engaging the cooperating frame lug through its inner end, a shiftable lever having a threaded end and disposed transversely in one said nut-shaped member for providing a permanent control of the rotation of the latter with respect of the corresponding spindle end, a screwing home for said threaded end mounted on said spindle end, said threaded end and said screwing home being adapted to engage positively said spindle end with said lever for the common angular control of both said last named nut-shaped member and the spindle, and means for normally preventing rotation of the other nut-shaped member on the spindle end opposed to the lever.

5. A hub arrangement chiefly for association with a bicycle frame comprising two lugs rigid with the frame, a spindle revolubly carried by said lugs and including threaded ends and a flat sided portion near one of the threaded ends, a ring provided with outer notches and an internal flat sided opening fitted over the corresponding flat portion of the spindle, nut-shaped members screwed over the corresponding threaded ends of the spindles, means longitudinally rigid with said members frictionally engaging the cooperating frame lug, a radially tapped boss provided laterally on and rigid with the nut-shaped member on the side corresponding to the flat sided portion of the spindle, a lever including a threaded end adapted to engage threadedly the tapping in the boss for controlling the angular position of the corresponding nut-shaped member, the end of the lever engaging a notch in the ring for a sufficient screwing of the lever in the boss to make said ring and spindle angularly rigid with the nut-shaped member, and means engaging the nut-shaped member on the opposite end of the spindle against rotation thereof.

6. A hub arrangement chiefly for association with a bicycle frame comprising two lugs rigid with the frame, a spindle revolubly carried by said lugs and including threaded ends and a flat sided portion near one of the threaded ends, a ring provided with outer notches and an internal flat sided opening fitted over the corresponding flat portion of the spindle, nut-shaped members screwed over the corresponding threaded ends of the spindles, means longitudinally rigid with said members frictionally engaging the cooperating frame lug, a boss provided laterally on and rigid with the nut-shaped member on the side corresponding to the flat sided portion of the spindle and defining an inner longitudinal chamber and bores connecting same with the inner and outer surfaces of the boss, a lever slidingly engaging said recess and bores and projecting outwardly of said boss for controlling the angular setting of the boss and cooperating nut-shaped member, the inner end of the lever being adapted to engage a notch in the ring when the lever is sufficiently pushed in for making said ring and the spindle angularly rigid with the nut-shaped member, and a spring housed in the boss chamber for urging the lever in a predetermined direction, and means engaging the nut-shaped member on the opposite end of the spindle against rotation thereof.

7. A hub arrangement for association with a bicycle frame comprising two lugs rigid with the frame, a spindle revolubly carried by said lugs and including threaded ends and a flat sided portion near one of the threaded ends, a ring provided with outer notches and an internal flat sided opening fitted over the corresponding flat portion of the spindle, nut-shaped members screwed over the corresponding threaded ends of the spindles, means longitudinally rigid with said members frictionally engaging the cooperating frame lug, a boss provided laterally on and rigid with the nut-shaped member on the side corresponding to the flat sided portion of the spindle and defining an inner longitudinal chamber and bores connecting same with the inner and outer surfaces of the boss, a lever slidingly engaging said recess and bores, adapted to assume a helical movement with reference to the boss and projecting outwardly of said boss for controlling the angular setting of the boss and cooperating nut-shaped member, the inner end of the lever being adapted to engage a notch in the ring when the lever is sufficiently pushed in for making said ring and the spindle angularly rigid with the nut-shaped member, a spring housed in the boss chamber for urging the lever in a predetermined direction, and means engaging the nut-shaped member on the opposite end of the spindle against rotation thereof.

8. A hub arrangement chiefly for association with a bicycle frame comprising two lugs rigid with the frame, a spindle revolubly carried by said lugs, a hub fitted over said spindle between the two lugs, a nut-shaped member screwed over each end of the spindle and frictionally engaging the cooperating frame lug through its inner end, a shiftable lever fitted over one end of said spindle and adapted to slide along said spindle and to engage one nut-shaped member, a forked member rigid with the spindle at the end of the spindle which carries said lever and adapted to be engaged positively by the lever for a predetermined longitudinal position thereof along said spindle and means for normally preventing rotation of the second nut-shaped member relatively to its cooperating frame lug.

9. A hub arrangement chiefly for association with bicycle frames comprising two lugs rigid with the frame, a spindle revolubly carried by said lugs, a hub fitted over said spindle between the two lugs, a nut-shaped member screwed over each end of the spindle and frictionally engaging the cooperating frame lug through its inner end, a shifting device comprising as a first element one of said nut-shaped members and as a second element the end of the spindle onto which said first element is screwed and a shiftable lever engaging permanently one of said elements and adapted to engage also the other of said elements for a predetermined position of said lever and to release same for another position thereof, a brake member associated with the outer end of the spindle on the side furthest from the lever in a direction of the axis of the spindle and a coil spring fitted between the brake member and the nut-shaped member on the corresponding end of the spindle for urging the latter member into engagement with the cooperating frame lug.

10. A hub arrangement chiefly for association with bicycle frames comprising two lugs rigid with the frame, a spindle revolubly carried by said lugs and provided with a longitudinal tapped blind bore at one end, a hub fitted over said spindle between the two lugs, a nut-shaped member screwed over each end of the spindle and including means frictionally engaging the cooperating frame lug through its inner end, a shifting device comprising as a first element one of said nut-shaped members and as a second element the end of the spindle onto which said first element is screwed and a shiftable lever engaging permanently one of said elements and adapted to engage also the other of said elements for a predetermined position of said lever and to release same for another position thereof, a screw with a large head engaging the tapped bore in the spindle and a coil spring held under compression between the head of said screw and the corresponding nut-shaped member.

11. A hub arrangement chiefly for association with bicycle frames comprising two lugs rigid with the frame provided with transversal slots, a spindle threaded at each end and revolubly carried by the lug slots, a hub fitted over said spindle and held between the two lugs, a nut-shaped member screwed over each end of said spindle and incorporating means adapted to frictionally engage the cooperating frame lug, a first one of said nut-shaped members being provided with a plurality of tappings facing the cooperating frame lug, a projecting stud adapted to be engaged selectively in one of said tappings for permitting solely a translational motion of said spindle in the slot of said cooperating frame lug, a shifting device comprising as a first element the second of said nut-shaped members and as a second element the end of the spindle carrying said first element, and a shiftable lever engaging permanently one of said elements and adapted to engage also the other of said elements for a predetermined position of said lever and to release same for another position of said lever.

LUCIEN JUY.

No references cited.